: US011604792B2

(12) United States Patent
Cai et al.

(10) Patent No.: US 11,604,792 B2
(45) Date of Patent: Mar. 14, 2023

(54) METHOD FOR CONSTRUCTING SQL STATEMENT BASED ON ACTOR-CRITIC NETWORK

(71) Applicant: GUANGDONG UNIVERSITY OF TECHNOLOGY, Guangdong (CN)

(72) Inventors: Ruichu Cai, Guangdong (CN); Boyan Xu, Guangdong (CN); Zhihao Liang, Guangdong (CN); Zijian Li, Guangdong (CN); Zhifeng Hao, Guangdong (CN); Wen Wen, Guangdong (CN); Bingfeng Chen, Guangdong (CN)

(73) Assignee: GUANGDONG UNIVERSITY OF TECHNOLOGY, Guangdong (CN)

( * ) Notice: Subject to any disclaimer, the term of this patent is extended or adjusted under 35 U.S.C. 154(b) by 546 days.

(21) Appl. No.: 16/824,705

(22) Filed: Mar. 20, 2020

(65) Prior Publication Data
US 2020/0301924 A1 Sep. 24, 2020

(30) Foreign Application Priority Data
Mar. 20, 2019 (CN) .......................... 201910216869.2

(51) Int. Cl.
| | | |
|---|---|---|
| *G06N 3/00* | (2006.01) | |
| *G06F 16/2452* | (2019.01) | |
| *G06F 16/242* | (2019.01) | |
| *G06F 16/28* | (2019.01) | |
| *G06F 16/25* | (2019.01) | |
| *G06F 9/30* | (2018.01) | |
| *G06N 3/08* | (2023.01) | |

(52) U.S. Cl.
CPC ...... *G06F 16/24522* (2019.01); *G06F 9/3016* (2013.01); *G06F 16/243* (2019.01); *G06F 16/2433* (2019.01); *G06F 16/25* (2019.01); *G06F 16/284* (2019.01); *G06N 3/08* (2013.01)

(58) Field of Classification Search
None
See application file for complete search history.

(56) References Cited

U.S. PATENT DOCUMENTS 11,170,287 B2 * 11/2021 Zhong .................... G06F 16/93

* cited by examiner

*Primary Examiner* — Tuankhanh D Phan
(74) *Attorney, Agent, or Firm* — JCIP Global Inc.

(57) ABSTRACT

The invention discloses a method and a device for constructing a SQL statement based on reinforcement learning, wherein the method includes: initializing an actor-critic network parameter; acquiring a sequence pair of natural language and real SQL statement from a data set; inputting a natural language sequence into an actor network encoder, and inputting a real SQL sequence into a critic network encoder; using an encoded hidden state as an initialized hidden state of a corresponding decoder; gradually predicting, by an actor network decoder, a SQL statement action, and inputting the SQL statement action to a critic network decoder and an environment to obtain a corresponding reward; and using a gradient descent algorithm to update the network parameters, and obtaining a constructing model of the natural language to the SQL statement after repeated iteration training.

6 Claims, 3 Drawing Sheets

METHOD FOR CONSTRUCTING SQL STATEMENT BASED ON ACTOR-CRITIC NETWORK

CROSS-REFERENCE TO RELATED APPLICATION

This application claims the priority benefit of China application serial no. 201910216869.2, filed on Mar. 20, 2019. The entirety of the above-mentioned patent application is hereby incorporated by reference herein and made a part of this specification.

TECHNICAL FIELD

The present invention relates to a method for constructing a SQL statement, and in particular, to a method for constructing a SQL statement based on an actor-critic network, and belongs to an innovative technology of the method for constructing a SQL statement based on an actor-critic network.

BACKGROUND

Structured Query Language (SQL) is a standard language commonly used in relational database systems, which can support functions including data insertion, query, update, and deletion, etc. To write high-quality queries for applications, relational database programs must be proficient in SQL and familiar with corresponding database frameworks. The tasks of both are challenging. To reduce the SQL programming difficulty and to relieve the learning burden of complex database frameworks have always been important topics in database research and industry. Researches on how to construct a natural language interface of database (NLIDB) have been widely concerned in recent years.

NLIDB refers to a system that allows users to input requests that can support natural language representation to access information stored in a database. Compared with other database information access interfaces, NLIDB supports natural language input without extra learning of artificial languages, making the expression of problems simple and enabling embedding into dialogue systems. However, NLIDB depends very much on the ability of the system to transform or understand the natural language. Existing NLIDB construction principles can be roughly divided into three ideas. The first one is an idea based on pattern matching, which implements a transformation function through one-to-one correspondence between a natural language template and a SQL query template, requiring a lot of manual work and having a poor flexibility. The second one is an idea based on machine translation, which directly transforms a natural language sequence into a SQL query language through a sequence-to-sequence model, and has the disadvantage that the model can only be updated through sentence similarity in the training process. The third one is an idea based on semantic parsing, which is intended to transform a natural language into a logical expression, introduces reinforcement learning to input tables through the logical expression to get feedback, and has the disadvantages of difficult training and not supporting large data table input.

The sequence-to-sequence model is a common neural network model. The input and output of the sequence-to-sequence model are both sequences. The goal is to learn the transformation between sequences. The sequence-to-sequence model is widely used in machine translation, text summary and other fields. The sequence-to-sequence model employs an Encoder-Decoder framework. The conversion from the input sequence to the output sequence includes two phases, namely an encoder phase and a decoder phase. The encoder phase mainly processes the input sequence, extracts key information of the input sequence, and stores the information into a neural network memory appropriately. The decoder phase is responsible for output generation, sequentially selects output words in a dictionary, and updates a memory state accordingly.

In general, both the encoder and the decoder adopt a Long Short-Term Memory (LSTM). In the encoder phase, an input sequence is inputted to the LSTM in time steps one by one, a hidden layer state $h_e$ is transferred and updated in time steps to obtain a hidden layer state $h_{en}$ of the last time step, and an initial hidden layer state $h_{d0}=h_{en}$ of the decoder is set.

In the decoder phase, in each time step, a predicted output $\widehat{y_{t-1}}$ and a hidden state $h_{t-1}$ from the previous time step are input, i.e., a new predicted output is generated based on the previous input information, and finally a predicted sequence $Y=\{\widehat{y_1},\widehat{y_2},\widehat{y_3},\ldots,\widehat{y_m}\}$ is generated. Therefore, the sequence-to-sequence model is to make predictions based on the input sequence, and an objective function thereof is:

$$P(Y|X)=\pi P(\widehat{y_t}|\widehat{y_1},\widehat{y_2},\widehat{y_3},\ldots \widehat{y_{t-1}},X)$$

An Actor-Critic algorithm is a classic reinforcement learning algorithm. In general, actor mainly makes predictions while critic mainly judge the predictions of the actors; or, "actor" represents policies, and "critic" represents estimations on value functions. In deep reinforcement learning, "actor" and "critic" can be approximated by nonlinear neural networks.

In a specific scenario, reinforcement learning aims to obtain a real policy $\pi^*$ to solve the problem, but in fact, the real policy is unknown. At this time, an optimal policy $\pi$ can be expressed by training a neural network, and $\pi$ can approximate the real policy through parameter learning. It is assumed that the policy parameter is $\theta$:

$$\pi(\theta)\approx\pi^*(\theta^*)$$

Under the optimal policy, an action probability distribution $\pi(\alpha/\theta)$ can be generated according to a current state, and then a specific Action A can be obtained by sampling:

$$A\sim\pi(\alpha/\theta)$$

and the specific action acts on the Environment to obtain a maximum future Reward and also start a new state. This neural network that expresses the optimal policy is the actor network.

The critic is a Value Function that generates a value $V(s)$ according to the current state as a desired reward for the corresponding state. In fact, a function approximation method is used to approximately express the value function by training a neural network. The critic is a neural network model, so it is also called a critic network.

The actor network generates an action probability distribution according to the current state, generates a specific action by sampling, and inputs the specific action into the environment to get the actual reward and the new state, and the critic network also obtains a desired reward return according to the current state, and updates the actor network parameter with the desired reward returned by the critic network (as a baseline), the actual reward and the new state according to the actor network. Meanwhile, the critic network may have deviation in judging the state in this process, so it is also necessary to revise its own parameters with the actual reward and the desired reward corresponding to the new state as targets.

SUMMARY

The present invention aims at providing a method for constructing a SQL statement based on an actor-critic network in view of the above problems. The present invention is a convenient and practical method for constructing a SQL statement based on an actor-critic network.

A technical solution of the present invention is as follows: the present invention relates to a method for constructing a SQL statement based on an actor-critic network, including the following steps of:

1) randomly initializing an actor network parameter θ and a critic network parameter ϕ respectively;

2) acquiring a natural language sequence $X=\{x_1, \ldots, x_n\}$ and a corresponding SQL sequence $Y_{real}=\{y_1, \ldots, y_m\}$ from a data set;

3) inputting each word of the natural language sequence X into an actor network encoder in unit of time steps;

4) taking a hidden state $h_{aen}$ of a last time step of the actor network encoder as an initial hidden state $h_{ad0}$ of an actor network decoder;

5) inputting each word of a real SQL statement sequence $Y_{real}$ into a critic network encoder in unit of time steps;

6) taking a hidden state $k_{cem}$ of a last time step of the critic network encoder as an initial hidden state $h_{cd0}$ of a critic network decoder;

7) receiving, by the actor network decoder, a SQL word $\widehat{y_{t-1}}$ and a hidden state $h_{adt-1}$ predicted in the previous time step to generate a word probability distribution P ($\widehat{y_t} | \widehat{y_1}, \ldots, \widehat{y_{t-1}}, X$);

8) randomly sampling to obtain a current word $\hat{y}_t$ according to the generated word probability distribution;

9) in each time step, when the current word $\hat{y}_t$ is obtained, combining the current word $\hat{y}_t$ with the previous predicted SQL sequence $\widehat{y_1}, \ldots, \widehat{y_{t-1}}$ and a real target sequence $Y_{real}$, inputting the current word $\hat{y}_t$, the previous predicted SQL sequence $\hat{y}_t, \ldots, \widehat{y_{t-1}}$ and the real target sequence $Y_{real}$ into an environment to obtain a current return $r(\widehat{y_1}, \ldots, \hat{y}_t, Y_{real})$, and inputting $\hat{y}_t$ into the critic network decoder to obtain a future long term reward evaluation value $V(\widehat{y_1}, \ldots, \hat{y}_t)$ based on the current predicted SQL sequence, and then repeating steps 7, 8 and 9;

10) calculating a long term reward $R_t$ of a current time step:

$$R_t = r(\widehat{y_1}, \ldots, \hat{y}_t, Y_{real}) + \gamma V(\widehat{y_1}, \ldots, \hat{y}_t);$$

11) in combination with the future long term reward $V(\widehat{y_1}, \ldots, \widehat{y_{t-1}})$ obtained in the previous time step (when t=1, let $V(\widehat{y_1}, \ldots, \widehat{y_{t-1}})=0$), calculating a loss through a loss function $L_\phi$, wherein $L_\phi$ is as follows:

$$L_\phi = (V(\widehat{y_1}, \ldots, \widehat{y_{t-1}}) - R_t)^2$$

using a gradient descent algorithm to update the critic network parameter ϕ, a gradient formula being as follows, wherein β is a learning rate:

$$\frac{\partial L_\varphi}{\partial \varphi} = \frac{\partial\left[(R_t - V(\widehat{y_1}, \ldots, \widehat{y_{t-1}}))^2\right]}{\partial \varphi}$$

$$= \frac{\partial(r(\widehat{y_1}, \ldots, \hat{y}_t) + \gamma V(\widehat{y_1}, \ldots, \hat{y}_t) - V(\widehat{y_1}, \ldots, \widehat{y_{t-1}}))^2}{\partial \varphi}$$

$$\varphi = \varphi - \beta \frac{\partial L_\varphi}{\partial \varphi}$$

12) similarly, a loss function for the actor network being:

$$L_\theta = -\log P(\hat{y}_t | \widehat{y_1}, \ldots, \widehat{y_{t-1}}, X) \times (R_t - V(\widehat{y_1}, \ldots, \widehat{y_{t-1}}))$$

using the gradient descent algorithm to update the actor network parameter θ, a gradient formula being as follows, wherein α is a learning rate:

$$\frac{\partial L_\theta}{\partial \theta} = \frac{\partial\left(\begin{array}{c}-\log P(\hat{y}_t | \widehat{y_1}, \ldots, \widehat{y_{t-1}}, X) \times \\ \left(\begin{array}{c}r(\widehat{y_1}, \ldots, \hat{y}_t) + \\ \gamma V(\widehat{y_1}, \ldots, \hat{y}_t) - V(\widehat{y_1}, \ldots, \widehat{y_{t-1}})\end{array}\right)\end{array}\right)}{\partial \theta}$$

$$\theta = \theta - \alpha \frac{\partial L_\theta}{\partial \theta}$$

the above describes a generating model for training the natural language to the SQL statement; when the model already exists, the corresponding SQL statement can be obtained by inputting the natural language.

The present invention is a method for constructing a SQL statement based on an actor-critic network, wherein the SQL is a standard management language of a relational database. The SQL is difficult to be written. It is difficult for a user who has no programming learning experience to write the SQL. Even for experienced programmers, before writing database-related applications, they still need to have a good command of SQL and to learn corresponding database frameworks to write efficient and usable query statements. Compared with a method for constructing a SQL statement based on matching, the method according to the present invention does not need a large number of manual operations, and flexibly supports more types of SQL statements. Compared with a conventional method for constructing a SQL statement based on sequence-to-sequence learning, the invention introduces a new framework of reinforcement learning to solve the problems of unequal loss functions and evaluations, error propagation, and the like. The present invention is a convenient and practical method for determining a predicted SQL sequence based on an actor-critic network, and has practical application significance.

DETAILED DESCRIPTION

Figure 1:
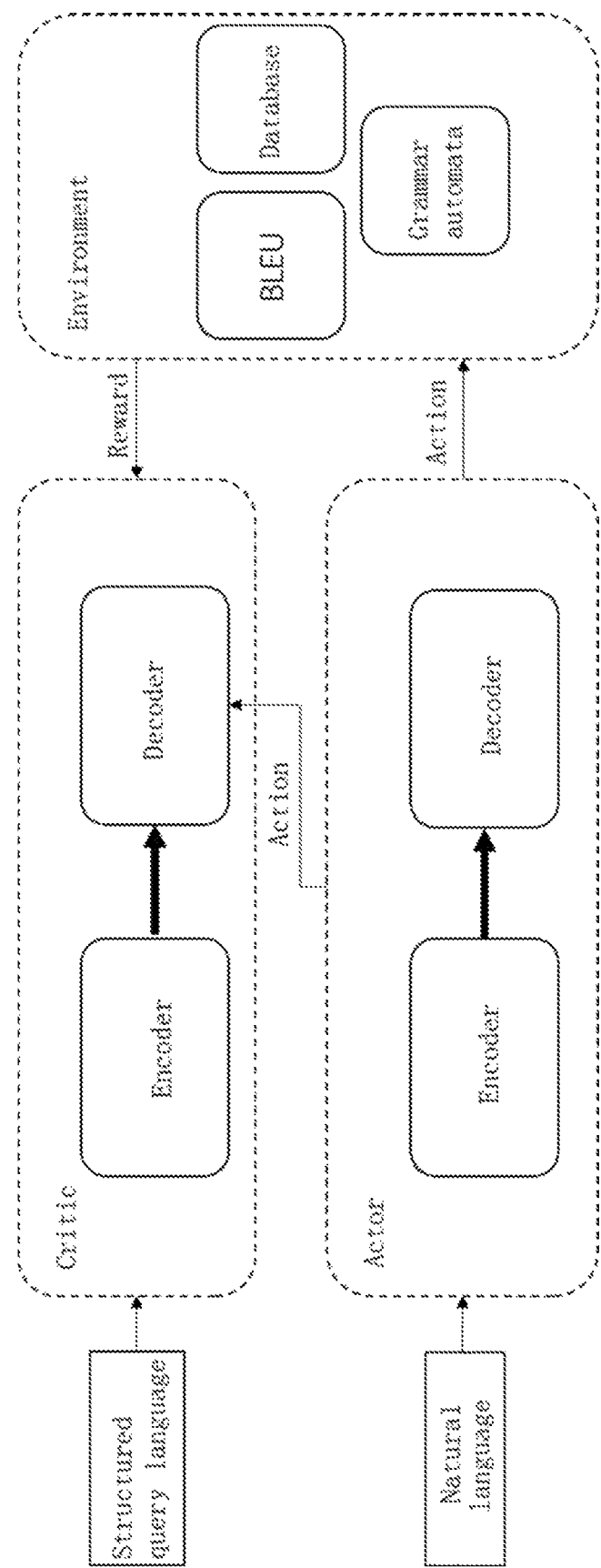
FIG. 1 is a schematic diagram of the present invention.
Figure 2:
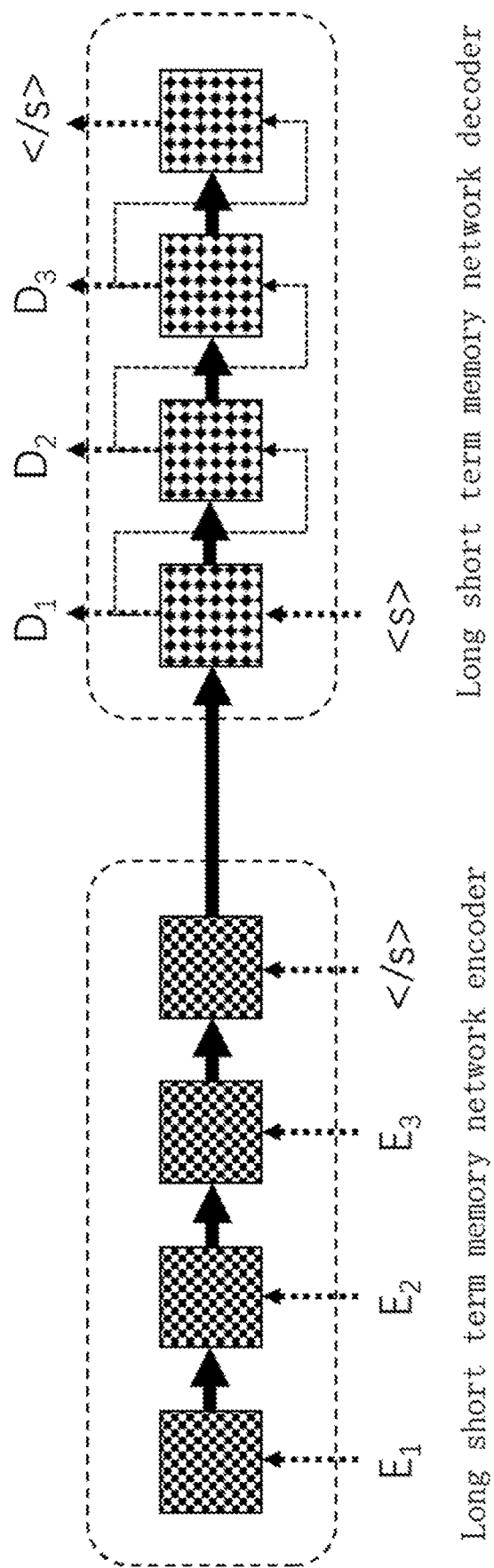
FIG. 2 is a schematic diagram of a sequence-to-sequence model of the present invention.
Figure 3:
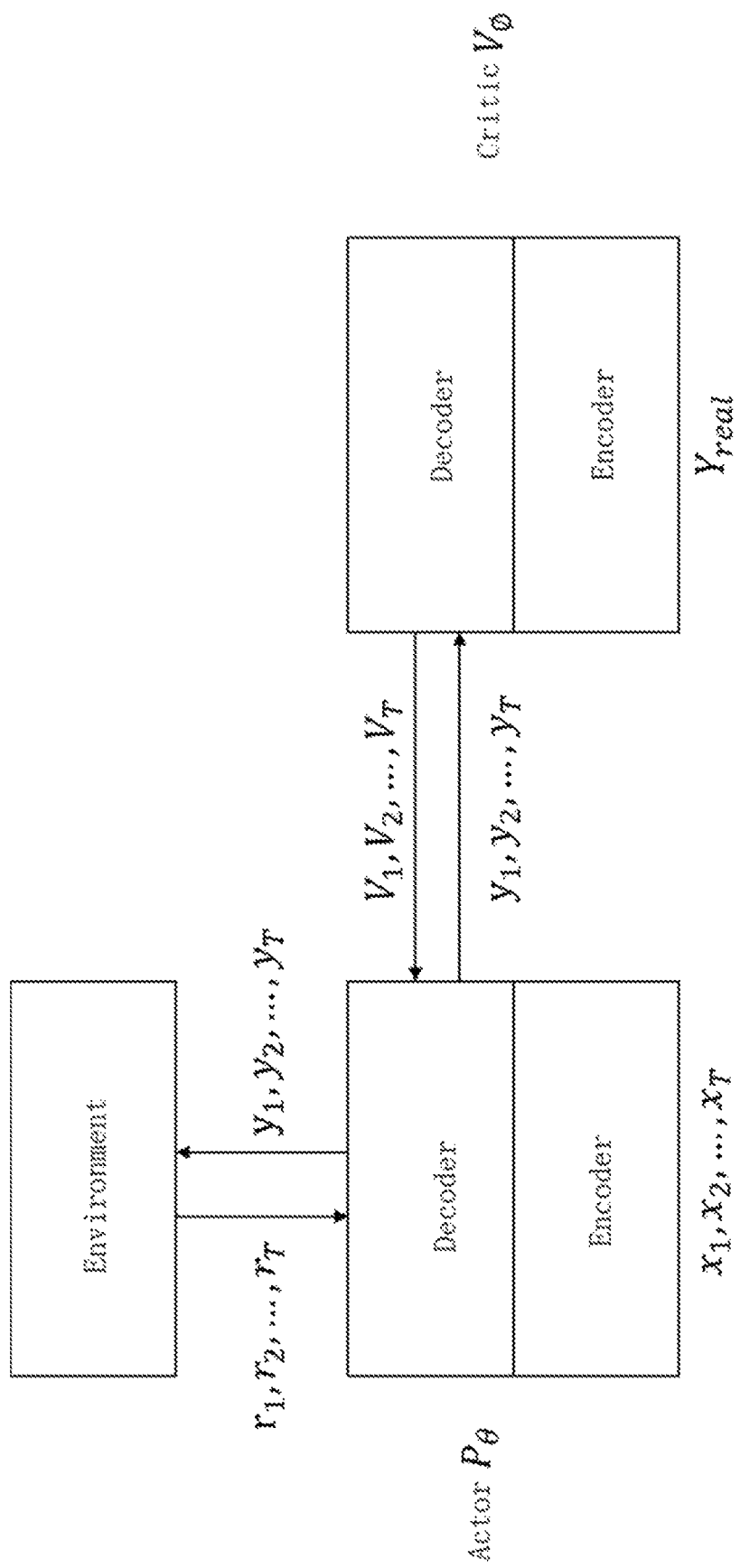
FIG. 3 is a schematic diagram of an actor-critic algorithm.

Embodiment:

The schematic diagram of the present invention is shown in FIG. 1. A method for constructing a SQL statement based on an actor-critic network according to the present invention includes the following steps of:

1) randomly initializing an actor network parameter θ and a critic network parameter ϕ respectively;

2) acquiring a natural language sequence $X=\{x_1, \ldots, x_n\}$ and a corresponding SQL sequence $Y_{real}=\{y_1, \ldots y_m\}$ from a data set;

wherein, Geo is a data set from natural language problems to SQL query statements based on the U.S. geographic fact database (Geobase); the natural language sequence $X=\{x_1, \ldots, x_n\}$ and the corresponding SQL sequence $Y_{real}=\{y_1, \ldots, y_m\}$ can be obtained from Geo;

in addition, the above data set can also be commonly used Oracle, MySQL, SQL Server and so on, as long as SQL query, update, deletion and other management operations are supported since SQL is a standard management language for relational databases;

3) inputting each word of the natural language sequence X into an actor network encoder in unit of time steps;

4) taking a hidden state $h_{aen}$ of a last time step of the actor network encoder as an initial hidden state $h_{ad0}$ of an actor network decoder;

5) inputting each word of a real SQL statement sequence $Y_{real}$ into a critic network encoder in unit of time steps;

6) taking a hidden state $k_{cem}$ of a last time step of the critic network encoder as an initial hidden state $h_{cd0}$ of a critic network decoder;

7) receiving, by the actor network decoder, a SQL word $\widehat{y_{t-1}}$ and a hidden state $h_{adt-1}$ predicted in the previous time step to generate a word probability distribution $P(\hat{y}_t | \widehat{y_1}, \ldots \widehat{y_{t-1}})$;

8) randomly sampling to obtain a current word $\hat{y}_t$ according to the generated word probability distribution;

9) in each timestep, when the current word $\hat{y}_t$ is obtained, combining the current word $\hat{y}_t$ obtained with the previous predicted SQL sequence $\widehat{y_1}, \ldots \widehat{y_{t-1}}$ and a real target sequence $Y_{real}$, inputting the current word $\hat{y}_t$, the previous predicted SQL sequence $\widehat{y_1}, \ldots \widehat{y_{t-1}}$ and the real target sequence $Y_{real}$ into an environment to obtain a current return $r(\widehat{y_1}, \ldots, \hat{y}_t, Y_{real})$, and inputting $\hat{y}_t$ into the critic network decoder to obtain a future long term reward evaluation value $V(\widehat{y_1}, \ldots, \hat{y}_t)$ based on the current predicted SQL sequence, and then repeating steps 7, 8 and 9;

10) calculating a long term reward $R_t$ of a current time step:

$$R_t = r(\widehat{y_1}, \ldots, \hat{y}_t, Y_{real}) + \gamma V(\widehat{y_1}, \ldots, f);$$

11) in combination with the future long term reward $V(\widehat{y_1}, \ldots, \widehat{y_{t-1}})$ obtained in the previous time step (when $t=1$, let $V(\widehat{y_1}, \ldots, \eta)=0$), calculating a loss through a loss function $L_{99}$, wherein $L_\phi$ is as follows:

$$L_\phi = (V(\widehat{y_1}, \ldots, \eta) - R_t)^2$$

using a gradient descent algorithm to update the critic network parameter φ, a gradient formula being as follows, wherein β is a learning rate:

$$\frac{\partial L_\varphi}{\partial \varphi} = \frac{\partial \left[(R_t - V(\widehat{y_1}, \ldots, \widehat{y_{t-1}}))^2\right]}{\partial \varphi}$$

$$= \frac{\partial (r(\widehat{y_1}, \ldots, \hat{y}_t) + \gamma V(\widehat{y_1}, \ldots, \hat{y}_t) - V(\widehat{y_1}, \ldots, \widehat{y_{t-1}}))^2}{\partial \varphi}$$

$$\varphi = \varphi - \beta \frac{\partial L_\varphi}{\partial \varphi}$$

12) similarly, a loss function for the actor network being:

$$L_\theta = -\log P(\hat{y}_t | \widehat{y_1}, \ldots, \widehat{y_{t-1}}, X) \times (R_t - V(\widehat{y_1}, \ldots, \widehat{y_{t-1}}))$$

using the gradient descent algorithm to update the actor network parameter θ, a gradient formula being as follows, wherein α is a learning rate:

$$\frac{\partial L_\theta}{\partial \theta} = \frac{\partial \left( \begin{array}{c} -\log P(\hat{y}_t | \widehat{y_1}, \ldots, \widehat{y_{t-1}}, X) \times \\ \left( \begin{array}{c} r(\widehat{y_1}, \ldots, \hat{y}_t) + \\ \gamma V(\widehat{y_1}, \ldots, \hat{y}_t) - V(\widehat{y_1}, \ldots, \widehat{y_{t-1}}) \end{array} \right) \end{array} \right)}{\partial \theta}$$

$$\theta = \theta - \alpha \frac{\partial L_\theta}{\partial \theta}$$

the above describes a generating model for training the natural language to the SQL statement; when the model already exists, the corresponding SQL statement can be obtained by inputting the natural language.

The actor network parameter θ and the critic network parameter φ in the step 1) respectively correspond to all adjustable numerical parameters in the two networks. The actor network parameter θ and the critic network parameter φ refer to a weight adjusted in an artificial neural network, usually a numerical parameter adjusted by a learning algorithm; and the weight can be regarded as a connection strength between neurons.

The data set in the step 2) is collected by manual or machine statistics, is a natural language-SQL pair, and can be divided into a training set and a test set in proportion for training a learning network and evaluating a reliability of the network respectively.

The time step in the step 3) refers to a unit of inputting or outputting when a recurrent neural network processes the sequence data. The actor network structure and the critic network structure are both encoder-decoder models, while the encoder and the decoder are respectively a Long Short-Term Memory, which is a type of recurrent neural network.

An output layer maps and generates a probability distribution of words, according to a network structure and a weight parameter, in the step 7).

The gradient descent algorithm in the step 11) and the step 12) is as follows:

111) supposing there is an objective function J(θ) regarding a neural network parameter θ;

112) calculating a gradient $$\nabla J(\theta) = \frac{\partial J(\theta)}{\partial \theta} J(\theta);$$

and 113) updating the parameter θ with an updating step size α(α>0), wherein θ=θ−α∇J(θ);

the gradient descent algorithm being an iterative algorithm to solve a minimum value, which can reduce J(θ) until reaching a local or global minimum value in the process of iteration.

Both the actor network and the critic network employ an encoder-decoder framework, i.e., a sequence-to-sequence model, but the input and output of the model are different.

The actor network encoder receives the natural language sequence X as an input, a current time step is t, and decoding is performed according to the previously predicted SQL sequence $\widehat{y_1}, \widehat{y_2}, \widehat{y_3}, \ldots, \widehat{y_{t-1}}$ to generate a word $\hat{y}_t$ as an action. The generation of word (action) is obtained by randomly sampling through the word probability distribution $P(\hat{y}_t | \widehat{y_1}, \widehat{y_2}, \widehat{y_3}, \ldots, \widehat{y_{t-1}}, X)$ generated in the actor network, i.e.:

$$\hat{y}_t \sim P(\hat{y}_t | \widehat{y_1}, \widehat{y_2}, \widehat{y_3}, \widehat{y_{t-1}}, X)$$

The learning process of the actor network requires a future long-term reward as feedback, rather than a certain short-term reward. Because the long-term reward can better reflect the overall advantages or disadvantages of a policy; while the short-term rewards more reflect advantages or disadvantages of the current state, but do not make long term considerations, in which case the overall optimal policy of learning may be missed. The future long-term reward is expressed as the accumulation of short term rewards for the current time step and each time step thereafter:

$$R_t = \sum_{\tau=t}^{\infty} r_\tau$$

Using a long-term reward requires the actor network to generate actions of multiple time steps and calculate short term rewards of multiple corresponding time steps. However, it is not possible to update the actor network parameters in each time step, and the network parameters can only be updated in multiple time steps. This training problem can be solved by introducing a temporal-difference learning method. Since the critic network predicts the future long-term reward based on states, that is, the critic network can obtain an approximation value of the future long term reward in a certain state, after the actor network generates an action in a certain time step, the future long term reward can be transformed into:

$$R_t = r(\alpha; s) + \gamma V(s')$$

$r(\alpha; s)$ indicates a reward in the current time step obtained by generating an action a in a state s, and $V(s')$ indicates a state s'. It is supposed that the actor network enters a new state s' after generating an action in the state s; since the future reward is not actually returned by the environment at present, in order to express this uncertainty, $\gamma$ is set as a discount factor to discount the future reward judged by the critic network.

In combination with a SQL sequence prediction task encountered by the present invention, a state in a reward function and a value function is defined as a SQL sequence $\hat{y}_1, \ldots, \hat{y}_t$ up to a certain time step t here. After generating the word $\hat{y}_t$ of the current time step, and in combination with the previously predicted sequence $\hat{y}_1, \ldots, \widehat{y_{t-1}}$, the actor network enters the environment and compares the predicted sequence $\hat{y}_1, \ldots, \widehat{y_{t-1}}$ and word $\hat{y}_t$ with the target sequence $Y_{real}$ to generate a current return $r(\hat{y}_1, \ldots, \hat{y}_t, Y_{real})$ It is assumed that the long-term reward of the current time step is $R_t$, then:

$$R_t = r(y_1, \ldots, y_t, Y_{real}) + \gamma V(y_1, \ldots, y_t)$$

r is a reward function that represents the reward generated in the environment by the SQL sequence up to the current time step. V represents a value function expressed by the critic network, which evaluates the future long-term reward based on the SQL sequence predicted by the decoder up to the current time step.

Since the returned reward will act as feedback and has an impact on the prediction of the actor network, an established reward mechanism needs to clearly reflect the accuracy of the SQL sequence. As a computer programming language, SQL follows a specific programming syntax and is executable. To judge whether the predicted SQL sequence is correct, it is sufficient to compare whether the execution results of the predicted sequence and of the target sequence in a corresponding database are consistent. However, during the prediction process, the generated SQL sequence is incomplete and cannot be judged whether it is correct by execution. BLEU is often used to compare the similarities of languages in the field of machine translation. The introduction of BLEU evaluation obtains a BLEU value by calculating the number of word gram (n words as a unit) appearing simultaneously in both the predicted SQL sequence and the target SQL sequence, which reflects the similarity between the predicted SQL sequence and the target SQL sequence. The higher the BLEU value is, the more similar the predicted SQL sequence is to the target SQL sequence.

The above BLEU is a machine translation quality evaluation algorithm, the full name of which is "Bilingual Evaluation Understudy".

However, the similarity expressed by BLEU is not completely reliable, and errors may occur in many cases. For example, "SELECT FROM a A" is highly similar to "SELECT a FROM A", but the former is obviously grammatically incorrect, so it is obviously not comprehensive to consider the similarity between the predicted SQL sequence and the target SQL sequence. Therefore, the present invention introduces a SQL-based grammar automata for judgment in the reward mechanism. The SQL language conforms to a context-free grammar, so it can be accepted by a corresponding push down automata. Therefore, constructing the corresponding automata can check whether the predicted SQL sequence is legal, which is called "grammar automata". If the grammar automata accepts the current output statement, then the grammar is legal and the reward is 1; if the grammar automata rejects the statement, then the grammar is illegal and the reward is −1.

When one predicted SQL sequence is completed, directly comparing the retrieval results obtained by executing SQL is simpler, more intuitive, and more accurate than calculating the BLEU value of the predicted SQL sequence at the moment. Therefore, after completing the generation of the SQL sequence, the present invention determines the accuracy of the predicted SQL sequence by comparing the retrieval results of executing the predicted SQL and the target SQL; when the comparison results are consistent, then 1 is returned; otherwise, −1 is returned.

The actor network will generate a predicted SQL sequence $y_1, \ldots y_t$ with the increase of time steps. Because the accuracy of the SQL sequence needs to be considered from aspects of a literal level and execution results, the reward mechanism of the present invention is also divided into two phases which are an intermediate phase and an execution phase, and a specific reward function is defined as follows:

$$r(\hat{y}_1, \ldots, \hat{y}_t) = \begin{cases} a \times BLEU(\hat{y}_1, \ldots, \hat{y}_t, Y_{real}) + \\ b \times AM(\hat{y}_1, \ldots, \hat{y}_t) \end{cases} \text{Intermediate phase} \\ \begin{cases} a \times DB(res_{\hat{y}_1, \ldots, \hat{y}_t}, res_{Y_{real}}) + \\ b \times AM(\hat{y}_1, \ldots, \hat{y}_t) \end{cases} \text{Execution phase}$$

BLEU($\hat{y}_1, \ldots, \hat{y}_t, Y_{real}$) indicates the BLEU value between the predicted SQL sequence and the target sequence, within a range of [0,1]; DB($res_{\hat{y}_1,\ldots,\hat{y}_t}$, $res_{Y_{real}}$) indicates the comparison of the database execution results of the predicted SQL sequence and of the target SQL sequence. If the results are consistent, it is 1; otherwise it is −1. AM ($\hat{y}_1, \ldots, \hat{y}_t$) indicates that the grammar automata performs grammar check on the predicted SQL sequence, and returns 1 if it conforms to the grammar, otherwise returns −1; a and b are hyperparameters, which meet the condition a+b=1, and intend to weight two evaluation criteria of each formula.

The future long-term reward predicted up to the current time step will serve as a target to update the learning when the critic network is training. The critic network evaluates future long-term reward based on the SQL sequence $\hat{y}_1, \ldots, \hat{y}_t$ predicted by the current actor network. Although the critic network, like the actor network, uses the sequence-to-sequence model, the critic network encoder receives the target sequence $Y_{real}$ as an input, and the decoder performs decoding according to the previously predicted SQL sequence $\hat{y}_1, \ldots \widehat{y_{t-1}}$ to generate a value $V(\hat{y}_1, \ldots \widehat{y_{t-1}})$, which is the future long term reward evaluation value for the current predicted SQL sequence.

In the process of training and learning, the critic network approximates the real long-term reward by optimizing its parameter $\phi$. With respect to the predicted value $V(\hat{y}_1, \ldots, \widehat{y_{t-1}})$ and the target value $R_t$, the loss function $L_\phi$ is defined by mean square error:

$$L_{99}=(V(\hat{y}_1, \ldots \widehat{y_{t-1}})-R_t)^2$$

The parameter $\phi$ is then updated by the gradient descent algorithm, assuming that a learning rate is $\beta$:

$$\frac{\partial L_\varphi}{\partial \varphi} = \frac{\partial\left[(R_t - V(\hat{y}_1, \ldots, \widehat{y_{t-1}}))^2\right]}{\partial \varphi}$$

$$= \frac{\partial (r(\hat{y}_1, \ldots, \hat{y}_t) + \gamma V(\hat{y}_1, \ldots, \hat{y}_t) - V(\hat{y}_1, \ldots, \widehat{y_{t-1}}))^2}{\partial \varphi}$$

$$\varphi = \varphi - \beta \frac{\partial L_\varphi}{\partial \varphi};$$

During the training process, the actor network needs to calculate the loss according to the long term reward $R_t$ actually returned at present, the evaluation value $V(\hat{y}_1, \ldots, \widehat{y_{t-1}})$ predicted by the critic network, and $P(\hat{y}_t | \hat{y}_1, \ldots, \widehat{y_{t-1}}, X)$ of the word which generated by random sampling at the current time step, then the loss function is defined as:

$$L_\theta = -\log P(\hat{y}_t | \hat{y}_1, \ldots, \widehat{y_{t-1}}, X) \times (R_t - V(\hat{y}_1, \ldots \widehat{y_{t-1}}))$$

$R_t - V(\hat{y}_1, \ldots, \widehat{y_{t-1}})$ is a temporal-difference residual, which expresses the difference between the actually obtained future long term reward (although the evaluation value is also introduced) and the future long-term reward evaluated by the critic network based on the future long term reward evaluated by the critic network. If the difference is higher than the evaluation reward, then an occurrence probability of an action selected in the current time step is increased. If the difference is lower than the evaluation reward, then the occurrence probability of the action is reduced.

After the loss value is obtained, the parameter $\theta$ is then updated by the gradient descent algorithm, assuming that a learning rate is $\alpha$:

$$\frac{\partial L_\theta}{\partial \theta} = \frac{\partial \begin{pmatrix} -\log P(\hat{y}_t | \hat{y}_1, \ldots, \widehat{y_{t-1}}, X) \times \\ \begin{pmatrix} r(\hat{y}_1, \ldots, \hat{y}_t) + \\ \gamma V(\hat{y}_1, \ldots, \hat{y}_t) - V(\hat{y}_1, \ldots, \widehat{y_{t-1}}) \end{pmatrix} \end{pmatrix}}{\partial \theta}$$

$$\theta = \theta - \alpha \frac{\partial L_\theta}{\partial \theta}$$

The initial parameters of the entire natural language-SQL generation network are randomly generated, and the learning algorithm makes the output accuracy of the model higher by continuously updating the weight parameters. The accuracy is obtained by comparing the real SQL with the predicted SQL. The present invention uses BLEU and database detection results.

BLEU and database detection results are both used to reward score calculation. When the predicted sequence is incomplete, BLEU is used as the reward score, and when the predicted sequence is complete (the last time step), the database detection result is used as the reward score.

What is claimed is:

1. A method for constructing a Structured Query Language (SQL) statement based on an actor-critic network, comprising:
   1) randomly initializing an actor network parameter $\theta$ and a critic network parameter $\varphi$ respectively;
   2) acquiring a natural language sequence $X=\{x_1, \ldots, x_n\}$ and a corresponding SQL sequence $Y_{real}=\{y_1, \ldots, y_m\}$ from a data set;
   3) inputting each word of the natural language sequence X into an actor network encoder in unit of time steps;
   4) taking a hidden state $h_{aen}$ of a last time step of the actor network encoder as an initial hidden state $h_{ad0}$ of an actor network decoder;
   5) inputting each word of a real SQL statement sequence $Y_{real}$ into a critic network encoder in unit of time steps;
   6) taking a hidden state $h_{cem}$ of a last time step of the critic network encoder as an initial hidden state $h_{cd0}$ of a critic network decoder;
   7) receiving, by the actor network decoder, a SQL word $\widehat{y_{t-1}}$ and a hidden state $h_{adt-1}$ predicted in a previous time step to generate a word probability distribution $P(\hat{y}_t | \hat{y}_1, \ldots \widehat{y_{t-1}}, X)$;
   8) randomly sampling to obtain a current word $\hat{y}_t$ according to the generated word probability distribution;
   9) in each timestep, when the current word $\hat{y}_t$ is obtained, combining the current word $\hat{y}_t$ with a previous predicted SQL sequence $\hat{y}_1, \ldots, \widehat{y_{t-1}}$ and a real target sequence $Y_{real}$, inputting into an environment to obtain a current return $r(\hat{y}_1, \ldots, \hat{y}_t, Y_{real})$ and inputting $\hat{y}_t$ into the critic network decoder to obtain a future long term reward evaluation value $V(\hat{y}_1, \ldots, \hat{y}_t)$ based on a current predicted SQL sequence, and then repeating steps 7, 8 and 9;
   10) calculating a long term reward $R_t$ of a current time step:

$$R_t = r(\hat{y}_1, \ldots \hat{y}_t, Y_{real}) + \gamma V(\hat{y}_1, \ldots, \hat{y}_t);$$

11) in combination with a future long term reward $V(\hat{y}_1, \ldots, \widehat{y_{t-1}})$ obtained in the previous time step, calculating a loss through a loss function $L_\phi$, wherein $L_\phi$ is as follows:

$$L_\phi = (V(\hat{y}_1, \ldots, \widehat{y_{t-1}}) - R_t)^2$$

using a gradient descent algorithm to update the critic network parameter $\varphi$, a gradient formula being as follows, wherein $\beta$ is a learning rate:

$$\frac{\partial L_\varphi}{\partial \varphi} = \frac{\partial\left[(R_t - V(\hat{y}_1, \ldots, \widehat{y_{t-1}}))^2\right]}{\partial \varphi}$$

$$= \frac{\partial (r(\hat{y}_1, \ldots, \hat{y}_t) + \gamma V(\hat{y}_1, \ldots, \hat{y}_t) - V(\hat{y}_1, \ldots, \widehat{y_{t-1}}))^2}{\partial \varphi}$$

$$\varphi = \varphi - \beta \frac{\partial L_\varphi}{\partial \varphi}$$

12) similarly, a loss function for an actor network being:
$$L_\theta = -\log P(\hat{y}_t | \widehat{y_1}, \ldots, \widehat{y_{t-1}}, X) \times (R_t - V(\widehat{y_1}, \ldots \widehat{y_{t-1}}))$$

using the gradient descent algorithm to update the actor network parameter θ, a gradient formula being as follows, wherein α is a learning rate:

$$\frac{\partial L_\theta}{\partial \theta} = \frac{\partial\left(\begin{array}{c}-\log P(\hat{y}_t | \widehat{y_1}, \ldots, \widehat{y_{t-1}}, X) \times \\ \left(\begin{array}{c}r(\widehat{y_1}, \ldots, \hat{y}_t) + \\ \gamma V(\widehat{y_1}, \ldots, \hat{y}_t) - V(\widehat{y_1}, \ldots, \widehat{y_{t-1}})\end{array}\right)\end{array}\right)}{\partial \theta}$$

$$\theta = \theta - \alpha \frac{\partial L_\theta}{\partial \theta}$$

the gradient formula describes a generating model for training a natural language to the SQL statement; when the model already exists, the corresponding SQL statement is obtained by inputting the natural language.

2. The method for constructing the SQL statement based on the actor-critic network according to claim 1, wherein the actor network parameter θ and the critic network parameter φ in the step 1) respectively correspond to all adjustable numerical parameters in the actor network and an critic network, the adjustable numerical parameters refer to a weight adjusted in an artificial neural network and are a numerical parameter adjusted by a learning algorithm, and the weight is regarded as a connection strength between neurons.

3. The method for constructing the SQL statement based on the actor-critic network according to claim 1, wherein the data set in the step 2) is collected by manual or machine statistics, and is a natural language-SQL pair, and is divided into a training set and a test set in proportion for training a learning network and evaluating a reliability of the learning network respectively.

4. The method for constructing the SQL statement based on the actor-critic network according to claim 1, wherein the time step in the step 3) refers to a unit of inputting or outputting when a recurrent neural network processes a sequence data.

5. The method for constructing the SQL statement based on the actor-critic network according to claim 1, wherein an output layer maps and generates the word probability distribution according to a network structure and a weight parameter, in the step 7).

6. The method for constructing a SQL statement based on an actor-critic network according to claim 1, wherein the gradient descent algorithm in the step 11) and the step 12) is as follows:

111) providing an objective function J(θ) regarding a neural network parameter θ;
112) calculating a gradient and $$\nabla J(\theta) = \frac{\partial J(\theta)}{\partial \theta} J(\theta);$$

and 113) updating the neural network parameter θ with an updating step size α(α>0), wherein θ=θ−Δ∇(θ);
the gradient descent algorithm being an iterative algorithm to solve a minimum value, which reduces J(θ) until reaching a local or global minimum value in a process of iteration.

* * * * *